(12) United States Patent
Akikusa et al.

(10) Patent No.: US 7,033,690 B1
(45) Date of Patent: Apr. 25, 2006

(54) SOLID OXIDE FUEL CELL

(75) Inventors: Jun Akikusa, Saitama (JP); Yoshitaka Tamou, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 23 days.

(21) Appl. No.: 09/891,501

(22) Filed: Jun. 27, 2001

(30) Foreign Application Priority Data

Jun. 28, 2000 (JP) ............................ P2000-193750

(51) Int. Cl.
*H01M 8/10* (2006.01)
(52) U.S. Cl. ........................................ 429/30; 429/33
(58) Field of Classification Search .................. 429/33, 429/30, 46, 40, 41, 44; 427/115
See application file for complete search history.

(56) References Cited

U.S. PATENT DOCUMENTS 6,287,716 B1 * 9/2001 Hashimoto et al. ........... 429/33

FOREIGN PATENT DOCUMENTS

| DE | 199 49 431 | * | 4/2000 |
| JP | 11-335164 | | 7/1999 |
| JP | 11-228136 A | | 8/1999 |

OTHER PUBLICATIONS

European Search Report dated Nov. 4, 2004.

* cited by examiner

*Primary Examiner*—Raymond Alejandro
(74) *Attorney, Agent, or Firm*—Rader, Fishman & Grauer PLLC

(57) ABSTRACT

The objective of the present invention is to provide a solid oxide fuel cell which has an improved efficiency with a solid electrolyte layer having an improved ionic conductivity, while maintaining the partition wall function; In order to attain this object, the present invention provides a solid oxide fuel cell comprising an air electrode layer, a fuel electrode layer, and a solid electrolyte layer interposed between said air electrode layer and said fuel electrode layer, wherein said solid electrolyte layer comprises a first electrolyte layer which is made of a lanthanide-gallate oxide and has a first ionic transference number and a first total electric conductivity, and a second electrolyte layer which is made of a lanthanide-gallate oxide and has a second ionic transference number smaller than said first ionic transference number and a second total electric conductivity larger than said first total electric conductivity; said air electrode layer is laminated onto one side of said solid electrolyte layer; and said fuel electrode layer is laminated onto the other side of said solid electrolyte layer.

5 Claims, 5 Drawing Sheets

950°C, $P_{O_2}=10^{-5}$ atm
$La_{0.8}Sr_{0.2}Ga_{0.8}Mg_{0.2-c}Co_cO_3$

—△— IONIC TRANSFERENCE NUMBER
—○— TOTAL ELLECTRIC CONDUCTIVITY

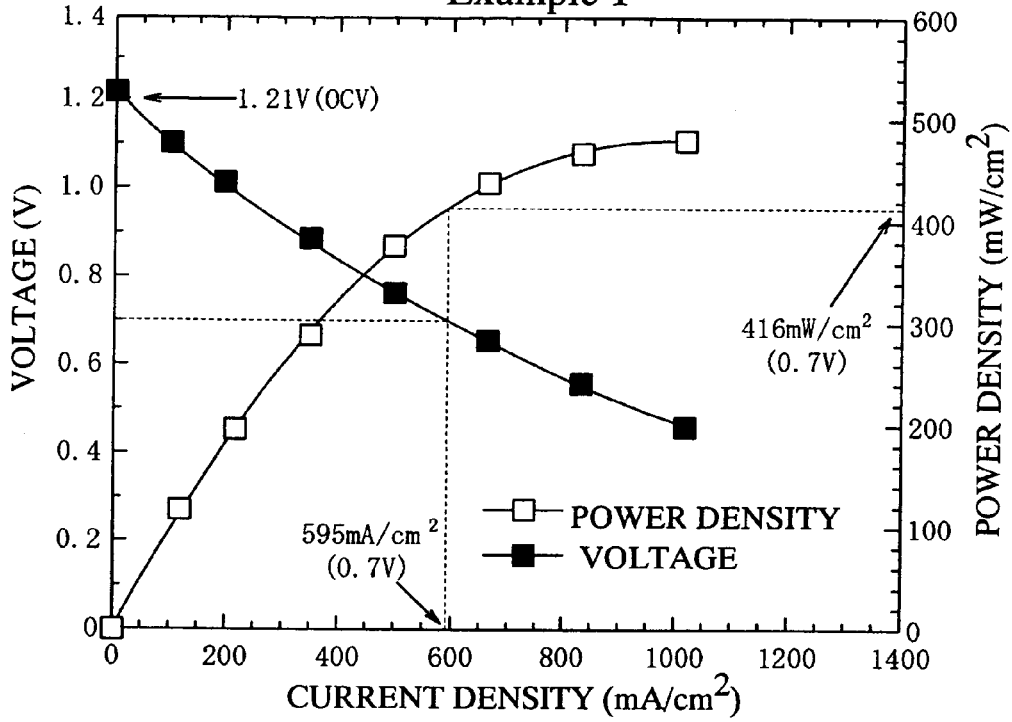
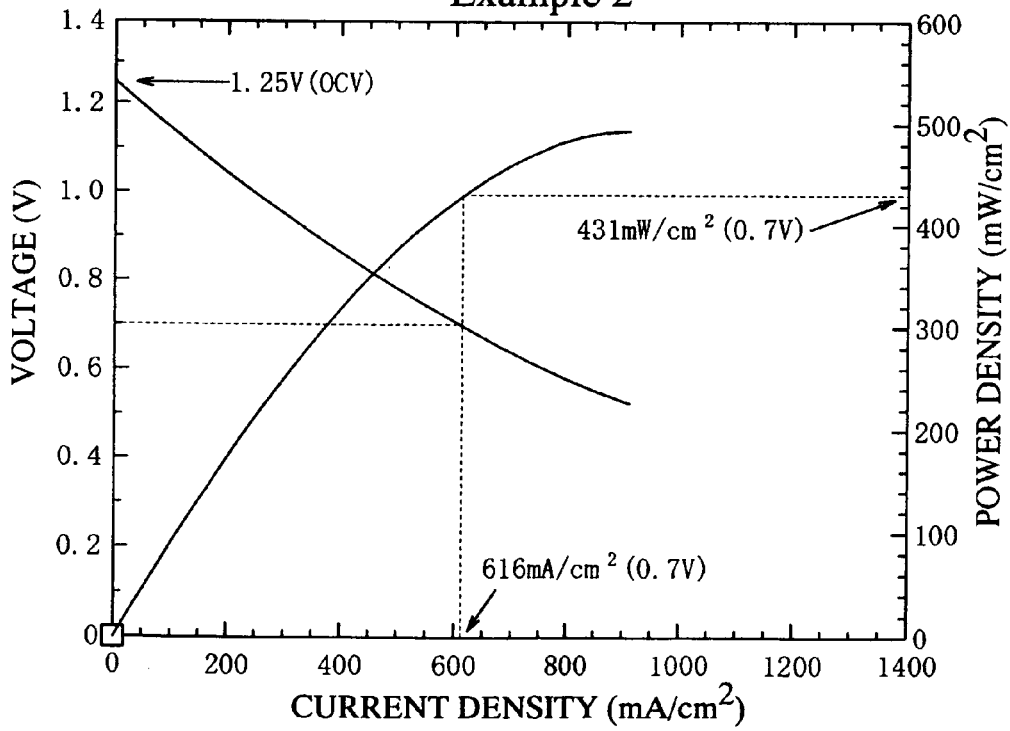

Example 3

Comparative Example 1

$La_{0.75}Sr_{0.15}Ga_{0.775}Mg_{0.125}Co_{0.1}O_{3-d}$

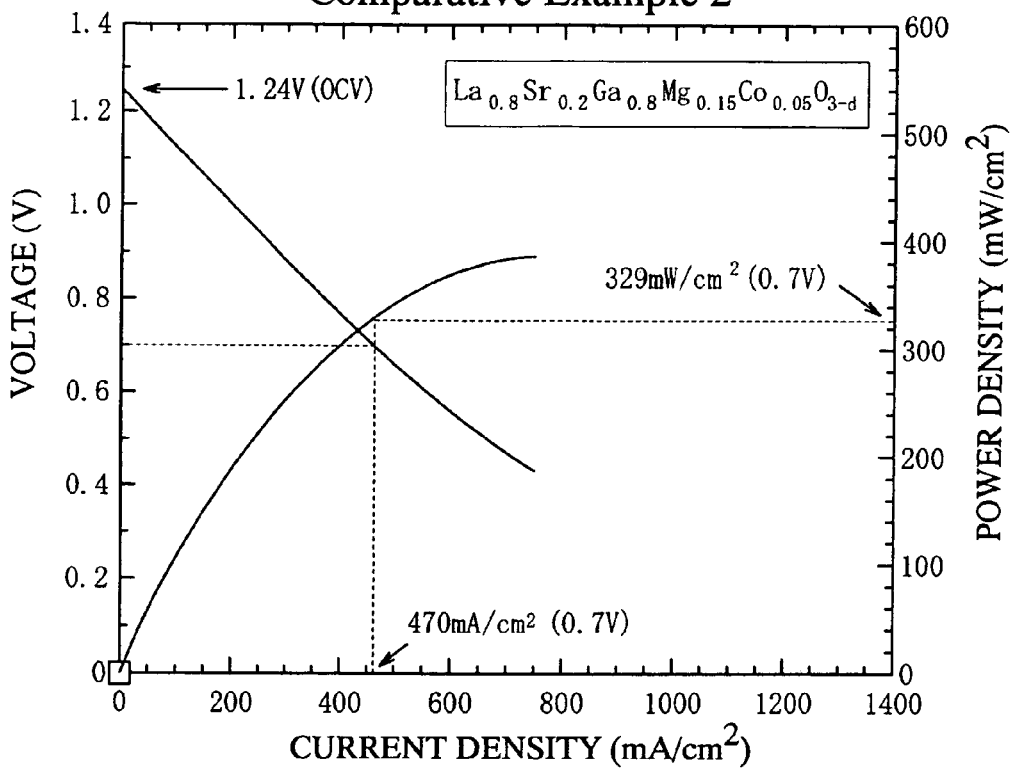
Fig. 7 Comparative Example 2
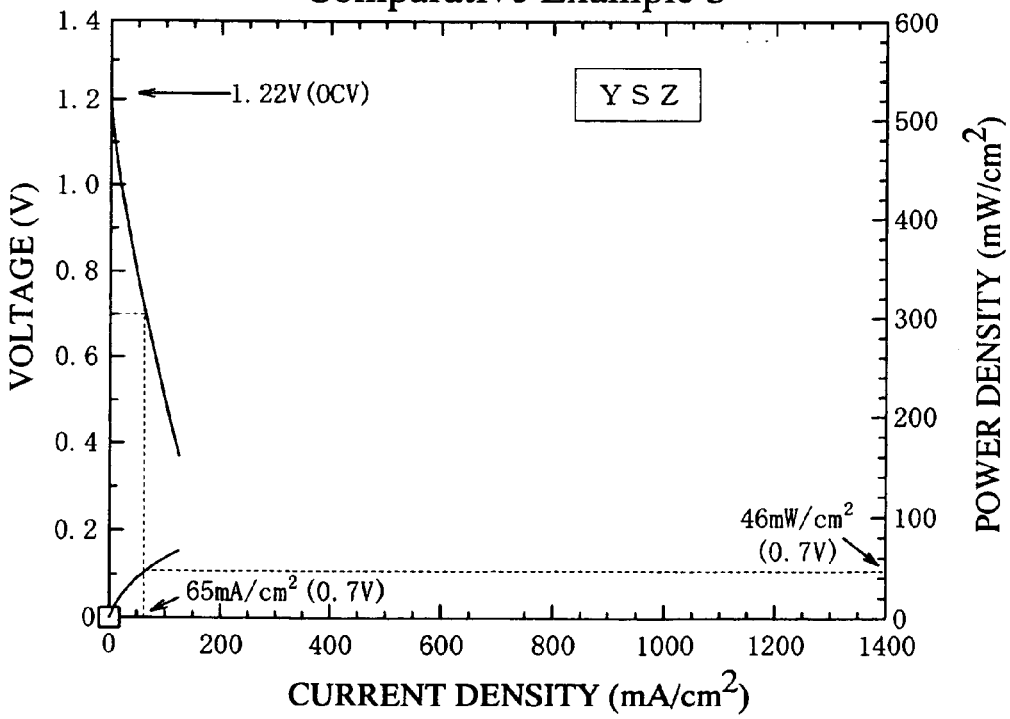
Fig. 8 Comparative Example 3

SOLID OXIDE FUEL CELL

BACKGROUND OF THE INVENTION

1. Field of the Invention

The present invention relates to a solid oxide fuel cell (SOFC) comprising a solid electrolyte layer placed between an air electrode layer and a fuel electrode layer, and is also called a solid electrolyte type fuel cell.

2. Description of the Related Art

A solid oxide fuel cell comprising a layered structure, in which a solid electrolyte layer composed of an oxide ion conductor is interposed between an air electrode and a fuel electrode layer, has been developed as a fuel cell for novel power generation. Solid oxide fuel cells are classified roughly into two types, such as a cylindrical type as shown in FIG. 9A and a planar type as shown in FIG. 9B.

The cylindrical type cell shown in FIG. 9A comprises an isolated porous ceramic cylinder substrate 1, an air electrode layer 2, a solid electrolyte layer 3, and a fuel electrode layer 4. The air electrode layer 2, the solid electrolyte layer 3, and the fuel electrode layer 4 are adhered onto the outer surface of the isolated porous ceramic cylinder substrate 1, in turn, so as to be arranged concentrically with each other. A conductive inter connector 5, which is a terminal of the air electrode, is laminated onto the solid electrolyte layer 3 so as to connect with the air electrode layer 2 via the solid electrolyte layer 3 and so as not to contact the fuel electrode layer 4. These layers may be formed by spray coating method, electrochemical deposition method, or slip casting method, etc.

The planar type cell shown in FIG. 9B comprises a solid electrolyte layer 3, an air electrode layer 2 laminated on one side of the solid electrolyte layer 3, and a fuel electrode layer 4 laminated on the other side of the solid electrolyte layer 3. The planar type cell is used by connecting another planar type cell via a dense inter connector 5 comprising gas channels on both sides. The planar type cell is formed by sintering a green sheet formed either by the doctor blade method, or extension method, or the like, thereby forming the solid electrolyte layer 3 which in turn coated by a slurry for the air electrode layer 2 on one side and a slurry for the fuel electrode layer 4 on the other side of the sheet. The final sintering can be done all together or in sequence. Moreover, the planar type cell can also be formed by preparing green sheets of the solid electrolyte layer 3, the air electrode layer 2 and the fuel electrode layer 4, superposing, and sintering them all together. Such a wet method must be low cost. Also, the spraying method or electrochemical deposition method can be used, similar to the case of the cylindrical type cell.

In these solid oxide fuel cells, oxygen is supplied to the air electrode layer side, and fuel gas, such as $H_2$ and CO, is supplied to the fuel electrode layer side. The air electrode layer 2 and the fuel electrode layer 4 are made of a porous material so as to allow gases to diffuse to the interface between the solid electrolyte layer 3 and the air electrode layer 2 or the fuel electrode layer 4. Oxygen supplied to the air electrode layer side passes through pores of the air electrode layer 2, and reaches in the vicinity of the interface between the air electrode layer 2 and the solid electrolyte layer 3. Then, the oxygen receives electrons from the air electrode layer 2, to be ionized, ($O^{2-}$). The oxide ions diffuse toward the fuel electrode layer 4 through the solid electrolyte layer 3. When the oxide ions reach in the vicinity of the interface between the solid electrolyte layer 3 and the fuel electrode layer 4, the oxide ions react with the fuel gas, generate a reaction product, such as $H_2O$ and $CO_2$, and discharge electrons to the fuel electrode layer 4.

The solid electrolyte layer 3 functions as a partition wall to prevent direct contact between the fuel gas and air, while being a medium for conducting oxide ions. Therefore, the solid electrolyte layer 3 must have gas impermeability and a high density. Moreover, the solid electrolyte layer 3 must be made of a material which has a high oxide ionic conductivity, a high chemical stability under the oxidizing atmosphere at the air electrode side and the reducing atmosphere at the fuel electrode side, and a high degree of being thermally shock-proof. For example, yttria stabilized zirconia (YSZ) is generally used as the material for the solid electrolyte layer 3.

However, the stabilized zirconia has a problem of decreasing ionic conductivity when the temperature decreases. For example, the ionic conductivity of $Y_2O_3$ stabilized zirconia is $10^{-1}$ s/cm at 1000° C., and is $10^{-4}$ s/cm at 500° C. Therefore, a fuel cell comprising a solid electrolyte layer 3 made of such electrolyte material must be used at temperatures about 1000° C., or at least 800° C. That is, the fuel cell must be used at high temperatures.

Japanese Unexamined Patent Application, First Publication No. Hei 11-335164 discloses an oxide ionic conductor having a perovskite structure as a material which can solve such a problem. The oxide ionic conductor is represented by general formula:

$Ln_{1-x}A_xGa_{1-y-z}B1_yB2_zO_3$, wherein Ln indicates lanthanide rare-earth metals, A indicates alkaline earth metals, B1 indicates non-transition metals, and B2 indicates transition metals. Namely, the oxide ionic conductor is a multiple oxide of 5 components (Ln+A+Ga+B1+B2) which is obtained by doping 3 kinds of elements, e.g. an alkaline earth metal (A), a non-transition metal (B1), and a transition metal (B2) into a lanthanide-gallate ($LnGaO_3$), or 4 components (Ln+A+Ga+B2) which is obtained by doping 2 kinds of elements, e.g. an alkaline earth metal (A) and a transition metal (B2) into a lanthanide-gallate ($LnGaO_3$).

The relationship between the percentage of B2 which are transition metal elements doped in the B site, and the total electric conductivity and the ionic transference number, in 5 components multiple oxide ionic conductor (e.g. $La_{0.8}Sr_{0.2}Ga_{0.8}Mg_{0.2-c}Co_cO_3$) is shown in FIG. 2. Total electric conductivity shown in FIG. 2 contains both the ionic and electronic components. It is clear that this lanthanide-gallate oxide has a high oxide ionic conductivity for a wide range of temperatures, which higher than that of stabilized zirconia, and also has high heat resistance. Furthermore, it is also confirmed that lanthanide-gallate oxide has a high ionic transference number at all oxygen partial pressures from the oxygen atmosphere to the hydrogen atmosphere. In other words, it is clear from FIG. 2 that the percentage of the oxide ionic conductivity with respect to the total electric conductivity is remarkably high in lanthanide-gallate oxide, which acts as an electronic-ionic mixed conductor. Therefore, the operating temperature limit of a solid oxide fuel cell, which is about 1000° C. in general, can be lowered by using lanthanide-gallate oxide for the solid electrolyte layer 3.

In order to increase the efficiency of the fuel cell, it is necessary to prevent electrons, which were discharged in the fuel electrode by reacting oxide ions with the fuel, from returning to the air electrode layer through the solid electrolyte layer, and to catch the electrons securely in the fuel electrode. To achieve this, the ionic transference number of the solid electrolyte comprising the solid electrolyte layer should ideally be 1.0. In other words, it is preferable that the total electric conductivity of the solid electrolyte is entirely due to the oxide ions, and that the electronic conduction is not possible between the air electrode layer and the fuel electrode layer at all. In order to bring the ionic transference number of lanthanide-gallate oxide disclosed in the Japanese Unexamined Patent Application, First Publication No. Hei 11-335164 close to 1.0, an added amount of a transition metal ($B2_z$), namely Co, is needed to cause a decrease, as shown in FIG. 2.

However, when the added amount of Co is small, the total electric conductivity is low and the performance of the fuel cell deteriorates.

When the thickness of the solid electrolyte layer 3 significantly decreases, the total electric conductivity increases, and the problem may be solved. However, when the thickness of the solid electrolyte layer 3 decreases, the partition wall function, which functions so as to prevent direct contact between the fuel gas and air, may be decreased. Therefore, there is a limit in the thickness of the solid electrolyte layer.

In consideration of the above-described problems with conventional technology, one of the objectives of the present invention is to provide a solid oxide fuel cell which has an improved efficiency achieved by a solid electrolyte layer having improved ionic conductivity, while maintaining the partition wall function.

SUMMARY OF THE INVENTION

The present invention provides a solid oxide fuel cell comprising an air electrode layer, a fuel electrode layer, and a solid electrolyte layer interposed between the air electrode layer and the fuel electrode layer, wherein the solid electrolyte layer comprises a first electrolyte layer which is made of a lanthanide-gallate oxide with a first ionic transference number and a first total electric conductivity, and a second electrolyte layer which is made of a lanthanide-gallate oxide with a second ionic transference number smaller than the first ionic transference number and a second total electric conductivity larger than the first total electric conductivity; the air electrode layer is laminated onto one side of the solid electrolyte layer; and the fuel electrode layer is laminated onto the other side of the solid electrolyte layer.

In the solid oxide fuel cell, the solid electrolyte layer made of a lanthanide-gallate oxide has a total electric conductivity larger than that of the conventional solid electrolyte layer made of YSZ. Therefore, as for the solid oxide fuel cell of the present invention, the operating temperatures can be lower than the conventional ones.

Moreover, oxide ions, which are ionized in the vicinity of the interface between the air electrode layer and the solid electrolyte layer, diffuse toward the fuel electrode layer through the first and the second electrolyte layers. Then, the oxide ions discharge electrons to the fuel electrode layer. The discharged electrons flow between the fuel electrode layer and the air electrode layer as an electric current. Thereby, the fuel cell acts as a power generator. Moreover, a portion of the electrons, which are discharged in the fuel electrode layer, try to return to the second electrolyte layer and diffuse toward the air electrode layer. However, the first electrolyte layer is positioned between the second electrolyte layer and the air electrode layer. The first electrolyte layer contains a small amount of Co and the ionic transference number is relatively high; therefore, the electronic conductivity is extremely small. Therefore, the electrons can hardly be conducted in the first electrolyte layer. Then, the electrons move in the solid electrolyte layer toward the fuel electrode layer again, and finally reach to the fuel electrode layer.

After that, the electrons flow between the fuel electrode layer and the air electrode layer as an electric current, similar to the electrons explained above. As a result, the ionic conductivity of the solid electrolyte layer can be remarkably improved, and the efficiency of the solid oxide fuel cell of the present invention can be improved.

Moreover, La is the most preferable among lanthanide (Ln). That is, La is more preferable than Ce, Pr, Nd, Pm, Sm, Eu, Gd, Tb, Dy, Ho, Er, Tm, Yb, and Lu.

Furthermore, among the lanthanide-gallate oxides, the lanthanide-gallate oxide is the most preferable, which is represented by $Ln_{1+a}A_aGa_{1-(b+c)}B_bCo_cO_3$, wherein Ln is lanthanide rare earth metals, A is one or more kinds of Sr, Ca, and Ba; B is one or more kinds of Mg, Al, and In; a is in a range from 0.05 to 0.3; b is in a range from 0 to 0.3; c is in a range from 0 to 0.2; and (b+c) is in a range from 0.025 to 0.3. Among lanthanide gallates oxides, the lanthanum-gallate oxide is preferable. In particular, a compound represented by the following general formula (1) is the most preferable. $La_{1-a}A_aGa_{1-(b+c)}B_bCo_cO_3$ (1), wherein A is one or more kinds of Sr, Ca, or Ba; B is one or more kinds of Mg, Al, and In; a is in a range from 0.05 to 0.3; b is in a range from 0 to 0.3; c is in a range from 0 to 0.2; and (b+c) is in a range from 0.025 to 0.3. Moreover, the amount of Co in the first electrolyte layer is preferably $0\% \leq Co \leq 80\%$ with respect to the amount of Co in the second electrolyte layer.

As shown in FIG. 2, the ionic transference number and the total electric conductivity of the lanthanum-gallate oxide depend on the c value. In other words, it is clear from FIG. 2 that when the c value decreases, the percentage of the ionic conductivity with respect to the total electric conductivity increases. Therefore, when the compound represented by general formula (1) is used as the lanthanide-gallate oxide, and the amount of Co in the first electrolyte layer is adjusted so as to be 0 or 80% or less with respect to the amount of Co in the second electrolyte layer, the first electrolyte layer having the ionic conductivity larger than that of the second electrolyte layer can be easily formed.

Moreover, the thickness of the solid electrolyte layer comprising the first and second electrolyte layers is preferably in a range from 1 to 500 µm (more preferably in a range from 5 to 100 µm). When the thickness of the solid electrolyte layer is less than 1 µm, the partition wall function may be lost. In contrast, when it is more than 1 µm, the total electric conductivity decreases; therefore, the efficiency of the solid oxide fuel cell also decreases.

The percentage of the thickness of the first electrolyte layer with respect to the thickness of the second electrolyte layer is preferably in a range from 1 to 20% (more preferably in a range from 3 to 10%). When the percentage of the thickness of the first electrolyte layer with respect to the thickness of the second electrolyte layer is less than 1%, pin-holes may be generated in the first electrolyte layer. In contrast, if it is more than 20%, the total electrical conductivity of the solid electrolyte layer decreases.

As explained above, when the amount of Co in the first electrolyte layer is less than that in the second electrolyte layer. The total electric conductivity of the first electrolyte layer becomes less than that of the second electrolyte layer. However, if the percentage of the thickness of the first electrolyte layer with respect to the thickness of the second electrolyte layer is set in a range from 1 to 20%; the decrease in the total electric conductivity of the first electrolyte layer can be prevented. Therefore, the total electric conductivity of the solid electrolyte layer comprising the first and second electrolyte layers can be optimized. In addition, both the first and second electrolyte layers act as a partition wall; therefore, the partition wall function of the solid electrolyte layer would not be lost even when the thickness of the first electrolyte layer decreases.

Furthermore, the amount of Co preferably decreases gradually from the second electrolyte layer to the first electrolyte layer in the vicinity of the interface between the first electrolyte layer and the second electrolyte layer. Since, the first electrolyte layer and the second electrolyte layer can be formed simultaneously, the solid electrolyte layer can be produced easily with low cost, compared with the method in which the first and second electrolyte layers are made separately, and then laminated. Moreover, the first and second electrolyte layers can be produced simultaneously by placing an alumina setter onto a green sheet having one composition when the green sheet is sintered.

Finally, the second electrolyte layer can be laminated onto the air electrode layer and the first electrolyte layer can be laminated onto the fuel electrode layer in the solid oxide fuel cell of the present invention.

BRIEF DESCRIPTION OF THE DRAWINGS

FIG. 3 is a graph showing the power generation characteristics of the fuel cell given in the Example 1 of the present invention.

FIG. 4 is a graph showing the power generation characteristics of the fuel cell given in the Example 2 of the present invention.

FIG. 7 is a graph showing the power generation characteristics of the fuel cell given in the Comparative Example 2.

FIG. 8 is a graph showing the power generation characteristics of the fuel cell given in the Comparative Example 3.

DETAILED DESCRIPTION OF THE PREFERRED EMBODIMENTS

In the following section, embodiments of a solid oxide fuel cell of the present invention will be explained referring to the figures. Moreover, in the following section, the lanthanum-gallate oxide is exemplified as the lanthanide-gallate oxides.

Figure 1:
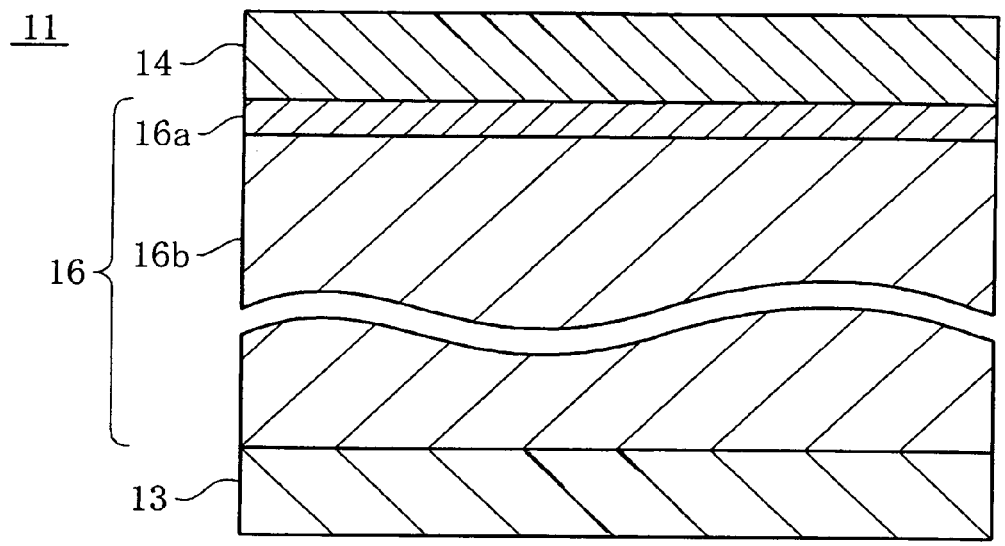
FIG. 1 is a cross-sectional sketch of the solid oxide fuel cell representing the present invention.

As shown in FIG. 1, a solid oxide fuel cell 11 comprises a fuel electrode layer 13 which is in contact with the fuel gas e.g. hydrogen, an air electrode layer 14 which is made of a porous material in contact with air, and a solid electrolyte layer 16 which is interposed between the fuel electrode layer 13 and the air electrode layer 14.

In the present fuel cell, the fuel electrode layer 13 becomes a negative electrode; and the air electrode layer 14 becomes a positive electrode. Thereby electric current flows between these electrodes when both electrodes are in electrical contact.

Moreover, the solid electrolyte layer 16 further comprises a first electrolyte layer 16a and a second electrolyte layer 16b. These first and second electrolyte layers 16a and 16b are made of a lanthanum-gallate oxide. The solid electrolyte layer 16 is formed by laminating the first electrolyte layer 16a with the second electrolyte layer 16b, which are produced separately. However, the solid electrolyte layer 16 can also be produced by partially removing Co from the surface layer of a precursor of the solid electrolyte layer 16. The first and second electrolyte layers 16a and 16b are simultaneously produced by this method. In addition, the solid electrolyte layer 16 can be produced easily, and cheaply, compared to the above method in which the first and second electrolyte layers are produced separately, and then laminated.

The first and second electrolyte layers 16a and 16b are made of lanthanum-gallate oxide represented by a general formula (1): $La_{1-a}A_aGa_{1-(b+c)}B_bCo_cO_3$.

In the general formula (1), A is one or more kinds of Sr, Ca, and Ba; and B is one or more kinds of Mg, Al, and In. In other words, the solid electrolyte layer 16 is made of a lanthanide gallate oxide which is a multiple oxide of 5 elements (Ln+A+Ga+B+Co) obtained by doping 3 kinds of elements containing an alkaline earth metal (A), a non-transition metal (B), and a transition metal (Co) into a lanthanide-gallate ($LnGaO_{3-d}$).

Moreover, the lanthanum-gallate oxide represented by the general formula (1) has a perovskite crystal structure, which is represented by $ABO_{3-d}$, and the A site is occupied by the A element, and the B site is occupied by Ga, the B element and Co. In general, the A site and the B site are occupied with divalent metals. However, when the A and B sites are occupied with a divalent metal (for example, the A element of the A site and the B element of the B site) and a transition metal (for example, Co of the B site), oxygen vacancies are generated. The oxide ionic conductivity is generated due to the oxygen vacancies. Moreover, oxygen atoms decrease in proportion to the number of oxygen vacancies.

In the general formula (1), a indicates the percentage of the A element and should be in the range from 0.05 to 0.3, (preferably in a range from 0.10 to 0.25); b indicates the percentage of the B element and should be in the range from 0 to 0.3 (preferably in a range from 0.05 to 0.2); c indicates the percentage of Co and is in a range from 0 to 0.2 (preferably in a range from 0.03 to 0.1); and (b+c) is in a range from 0.025 to 0.30 (preferably in a range from 0.10 to 0.25). When a is out of the above range, the total electric conductivity decreases. When c increases, the total electric conductivity increases, but the ionic transference number, that is the percentage of the oxide ionic conductivity with respect to the total electric conductivity, decreases. Therefore, c should preferably be in the above given range. When (b+c) increases, the total electric conductivity increases, but the ionic transference number decreases; therefore, (b+c) should preferably be in the above given range.

In the general formula (1), the A element is preferably Sr, and the B element is preferably Mg. Moreover, the atom ratio of oxygen is 3 in general formula (1). However, when a is not 0, oxygen vacancies are generated. Therefore, the atom ratio of oxygen is practically less than 3. The number of oxygen vacancies vary depending on the variations A and B elements, the preparation conditions, etc. For convenience, the atom ratio of oxygen is shown as 3 in the general formula (1).

The lanthanum-gallate oxide represented by general formula (1) is chemically stable under oxidizing atmosphere and reducing atmosphere at high temperatures, and the electric conductivity does not remarkably change. Therefore, the lanthanum-gallate oxide represented by the general formula (1) is suitable for the material of the solid electrolyte layer 16 of the solid oxide fuel cell 11.

In addition, the electric conductivity of the lanthanum-gallate oxide represented by the general formula (1) is higher than that of YSZ at all temperatures. For example, the fuel cell comprising the solid electrolyte layer made of YSZ cannot be operated at 600 to 800° C., because the electric conductivity of YSZ is low. In contrast, the fuel cell comprising the solid electrolyte layer 16 made of the lanthanum-gallate oxide represented by the general formula (1) can be used sufficiently at such temperatures. Of course, the fuel cell is stable and can be operated at high temperatures greater than 1000° C.

Figure 2:
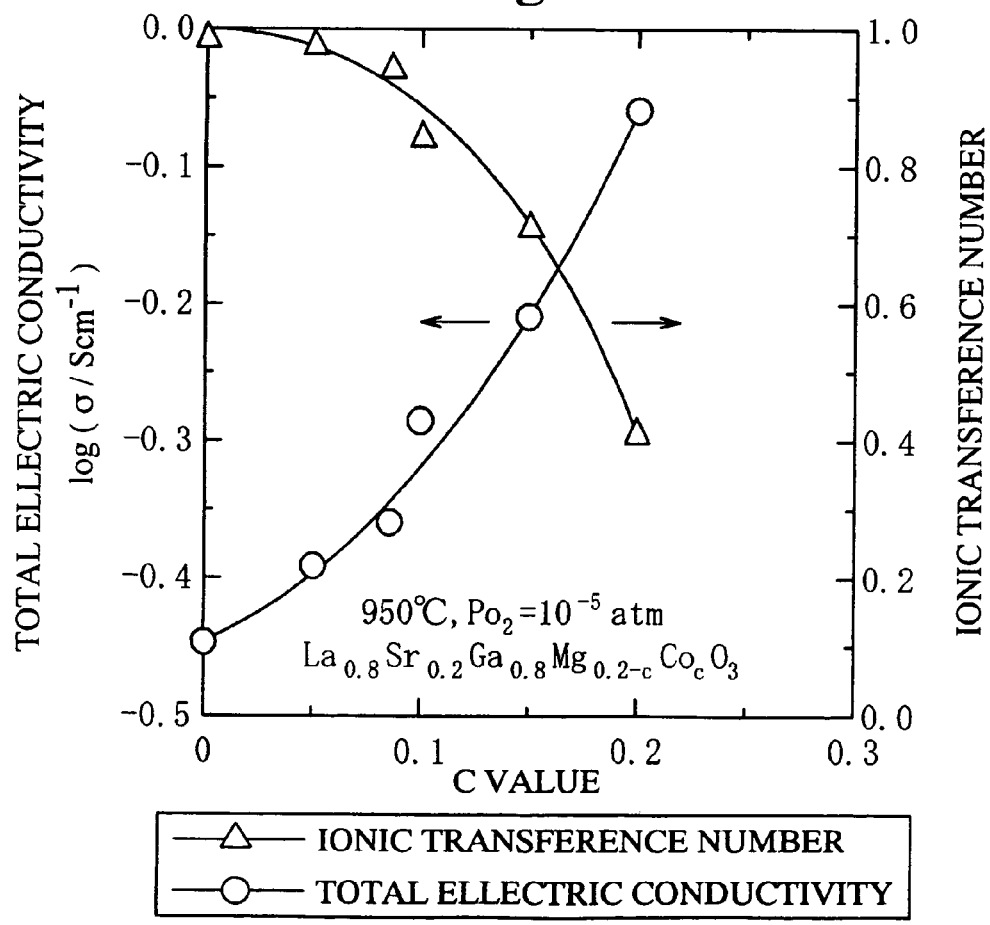
FIG. 2 is a graph showing the relationship between the concentration of transition metal, the total electric conductivity, and the ionic transference number, in 5 component multi oxide.
Figure 5:
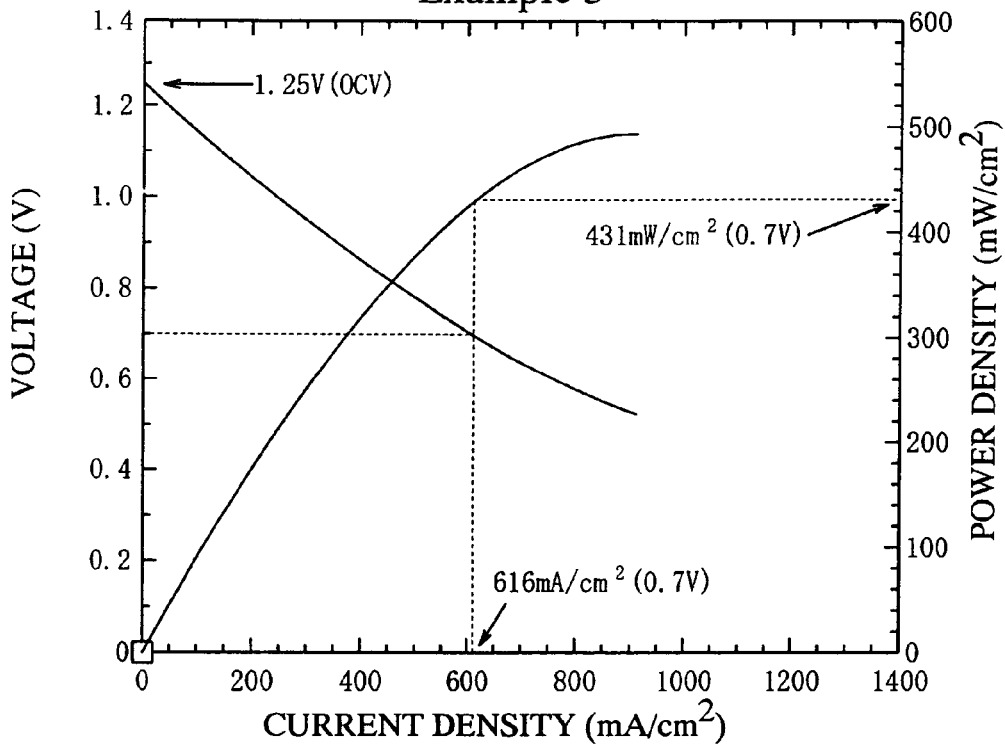
FIG. 5 is a graph showing the power generation characteristics of the fuel cell given in the Example 3 of the present invention.
Figure 6:
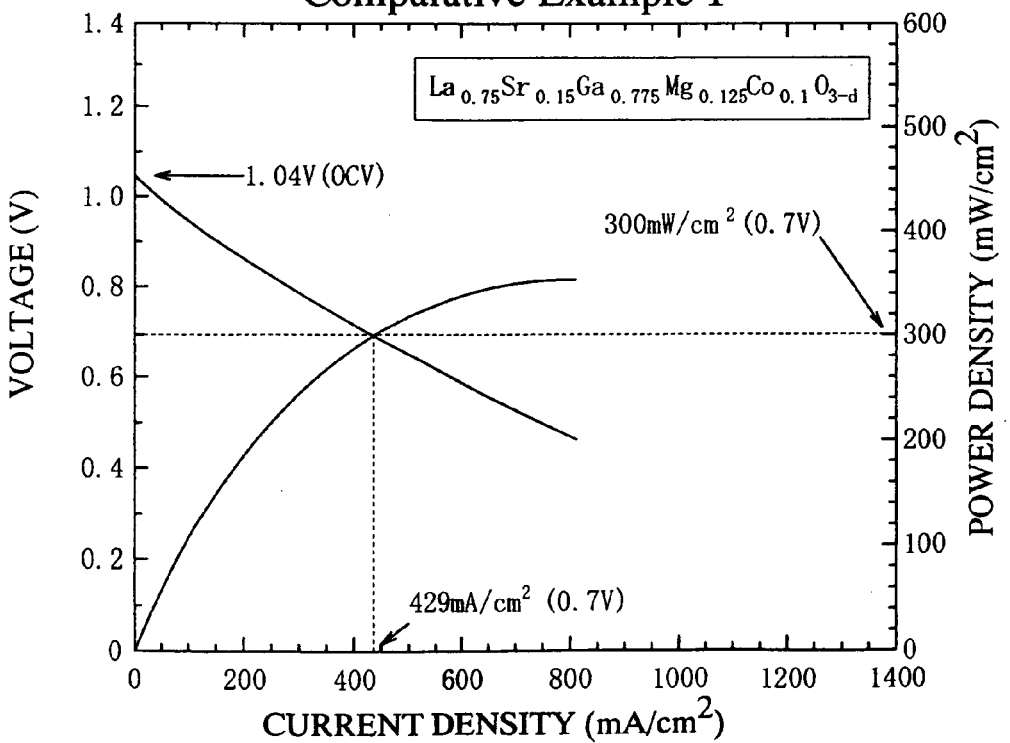
FIG. 6 is a graph showing the power generation characteristics of the fuel cell given in the Comparative Example 1.
Figure 9A:
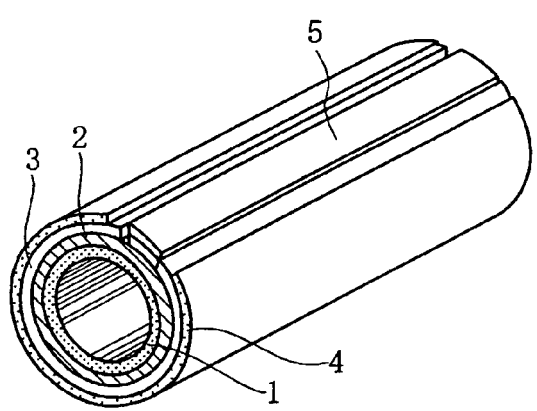
FIG. 9A is a perspective view showing a cylindrical solid oxide fuel cell.
Figure 9B:
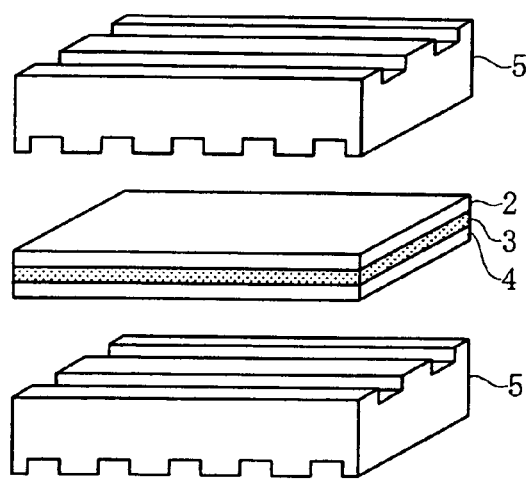
FIG. 9B is a perspective expanded view showing a planar solid oxide fuel cell.

As shown in FIG. 2, the total electric conductivity of the material represented by general formula (1) increases in proportion to the c value which is the atom ratio of Co. This is due to Co being a transition metal. That is, when the valence of Co varies, an n or p type electronic conduction is generated. Therefore, when a larger amount of Co is introduced to the material represented by the general formula (1), the electronic conductivity increases, and thereby the total electric conductivity also increases. However, the percentage of the oxide ionic conductivity with respect to the total electric conductivity, decreases. Namely, the ionic transference number decreases. Concretely, the ionic transference number of the 5 component multi oxide having a c value being 0.15 or less is 0.7 or greater. In particular, when the c value is 0.10 or less, the ionic transference number is 0.9 or greater. Moreover, when a certain amount of the B element being a non-transition metal does not exist in the B site, it is impossible to reduce the percentage of the electronic conductivity with respect to the total electric conductivity to 0.3 or less. In contrast, when the c value is more than 0.15, the ionic transference number is small, 0.7 or less. However, the multi oxide can act as an electron-ion multi conductor, namely an oxide ionic mixed conductor. It should be noticed that a 4 components multi oxide, in which Mg being the B element is entirely substituted for Co, has an ionic transference number of only about 0.3; however, it functions as an oxide ionic mixed conductor, therefore, it has the highest electric conductivity.

The first and second electrolyte layers 16a and 16b are made of the lanthanum-gallate oxide represented by the general formula (1). However, the amount of Co in the first electrolyte layer 16a is less than that in the second electrolyte layer 16b. The ionic transference number of the first electrolyte layer 16a is larger than that of the second electrolyte layer 16b. Moreover, the electric conductivity of the second electrolyte layer 16b is larger than that of the first electrolyte layer 16a.

The solid electrolyte layer 16 is produced by laminating green sheets of the first and second electrolyte layers 16a and 16b using the thermo-compression bonding method. Moreover, the solid electrolyte layer 16 can also be produced by sintering the first electrolyte layer 16a and coating a slurry for the second electrolyte layer 16b onto the first electrolyte layer 16a using a slurry coating method or a screen printing method, followed by resintering. Of course, the solid electrolyte layer 16 can also be produced by sintering the second electrolyte layer 16b and coating a slurry for the first electrolyte layer 16a onto the second electrolyte layer 16b and then resintering both. The method in which the first and second electrolyte layers 16a and 16b sintered together is preferable simply, because the number of sintering steps is fewer. The first and second electrolyte layers 16a and 16b can be produced by either a compression molding method, or a hydrostatic molding method, or a casting method, instead of the doctor blade method. In addition, the first or second electrolyte layer 16a or 16b can be directly formed onto the second or first electrolyte layer 16b or 16a by a slurry coating method, a doctor blade coating method, etc. Furthermore, the first or second electrolyte layer 16a or 16b can also be directly formed onto the sintered second or first electrolyte layer 16b or 16a by a slurry coating method, a screen printing method, a spraying method, etc. After that, the first and second electrolyte layers 16a and 16b are integrated by an appropriate heat treatment. The heat treatment conditions are not limited; however, the heat treatment temperature is preferably in a range from 1100 to 1500° C. When the heat treatment temperature is in the above given range, the treatment time may be in a range from 1 to 100 hours. The heat treatment is sufficiently carried out in air, but can also be carried out in an inert gas atmosphere.

In addition to these methods, the first and second electrolyte layers 16a and 16b can be produced by arranging an alumina setter onto a green sheet having one chemical composition when the green sheet is sintered. When the alumina setter is arranged onto the green sheet, and the alumina setter and the green sheet are sintered, Co in the green sheet diffuses towards the alumina setter. Thereby, an upper layer of the green sheet containing a small amount of Co becomes the first electrolyte layer 16a, and the remainder of the green sheet becomes the second electrolyte layer 16b. Moreover, the amount of Co in the first electrolyte layer 16a and the thickness of the first electrolyte layer 16a can be adjusted by changing the sintering temperature or the sintering time.

The thickness of the first electrolyte layer 16a is in a range from 1 to 20% with respect to the thickness of the second electrolyte layer 16b. The thickness of the solid electrolyte layer 16 is in a range from 1 to 500 μm.

The solid oxide fuel cell 11 is produced by laminating the air electrode layer 14 onto the first electrolyte layer 16a, and laminating the fuel electrode layer 13 onto the second electrolyte layer 16b. When the air electrode layer 14 is laminated onto the second electrolyte layer 16b and the fuel electrode layer 13 is laminated onto the first electrolyte layer 16a, the solid oxide fuel cell, which is not shown in the figures, can also be formed. This type of solid oxide fuel cell also has an excellent power generation characteristic.

Below, the functions of the solid oxide fuel cell 11 formed by the above-mentioned methods are explained.

Oxygen supplied in the air electrode layer 14 flows through the pores in the air electrode layer 14, and reaches in the vicinity of the interface between the air electrode layer 14 and the solid electrolyte layer 16. Then, the oxygen receives electrons from the air electrode layer 14, to be ionized to $O^{2-}$. The oxide ions diffuse toward the fuel electrode layer 13 through the solid electrolyte layer 16. Moreover, the total electric conductivity of the first electrolyte layer 16a is smaller than that of the second electrolyte layer 16b. However, the Co concentration in the first electrolyte layer 16a is less than that in the second electrolyte layer 16b; therefore, the ionic transference number in the first electrolyte layer 16a is higher than that in the second electrolyte layer 16b. In addition, the thickness of the first electrolyte layer 16a is very small, specifically it is in a range from 1 to 20% with respect to the thickness of the second electrolyte layer 16b. Thereby, the oxide ions can travel in the first electrolyte layer 16a toward the second electrolyte layer 16b.

Then, the oxide ions pass through the second electrolyte layer 16b. The second electrolyte layer 16b contains more Co than the first electrolyte layer 16a, and the total electric conductivity of the second electrolyte layer 16b is larger than that of the first electrolyte layer 16a. Therefore, although the second electrolyte layer 16b is thick, the oxide ions diffuse through the second electrolyte layer 16b and relatively easily reach in the vicinity of the interface between the fuel electrode layer 13 and the second electrolyte layer 16b. Then, the oxide ions react with the fuel gas, generate a reaction product, such as $H_2O$ and $CO_2$, and discharge electrons to the fuel electrode layer 4. The discharged electrons flow between the fuel electrode layer 13 and the air electrode layer 14 as an electric current. Thereby, the fuel cell 11 acts as a electric power generator.

Moreover, the total electric conductivity of the second electrolyte layer 16b is large; therefore, a portion of the electrons, which are discharged in the fuel electrode layer 13, try to return to the second electrolyte layer 16b and travel toward the air electrode layer 14. However, the first electrolyte layer 16a is positioned between the second electrolyte layer 16b and the air electrode layer 14. As explained above, the first electrolyte layer 16a contains a small amount of Co and the ionic transference number is relatively high; therefore, the electronic conductivity is extremely small. Therefore, the electrons can hardly travel in the first electrolyte layer 16a. Then, the electrons travel in the solid electrolyte layer 16 toward the fuel electrode layer 13 again, and finally reach the fuel electrode layer 13. After that, the electrons flow between the fuel electrode layer 13 and the air electrode layer 14 as an electric current, as the same way explained earlier.

Moreover, the lanthanum-gallate oxides are exemplified as the lanthanide-gallate oxides in the above explanation. However, of course, the lanthanide-gallate oxides beside the lanthanum-gallate oxide can be used in the present invention.

Next, the solid oxide fuel cell of the present invention will be explained referring to the following Examples and Comparative Examples.

EXAMPLE 1

The fuel cell 11 as shown in FIG. 1, which comprises the fuel electrode layer 13 having a diameter of 75 mm and a thickness of 60 μm, the solid electrolyte layer 16 having a diameter of 75 mm and a thickness of 100 μm, and the air electrode layer 14 having a diameter of 75 mm and a thickness of 40 μm, was produced.

The air electrode layer 14 was made of an oxide ionic mixed conductor represented by $Sm_{0.5}Sr_{0.5}CoO_{3-d}$. The fuel electrode layer 13 was made of a mixture containing Ni and a compound represented by $Ce_{0.8}Sm_{0.2}O_2$.

The first electrolyte layer 16a was made of a compound represented by $La_{0.8}Sr_{0.2}Ga_{0.8}Mg_{0.15}Co_{0.05}O_{3-d}$. The second electrolyte layer 16b was made of an oxide ionic mixed conductor represented by $La_{0.75}Sr_{0.15}Ga_{0.775}Mg_{0.125}Co_{0.1}O_{3-d}$. The solid electrolyte layer 16 was formed by the following steps. First, oxide powder materials were mixed to obtain the above compositions of the first and second electrolyte layers 16a and 16b. Then, the oxide mixtures were pre-sintered in a range from 900 to 1200° C. Slurries were prepared by crushing the obtained pre-sintered products by a ball mill, and adding binders and solvents to them. Laminated green sheets of the first and second electrolyte layers 16a and 16b were produced by coating the slurries by a doctor blade method. Then, the green sheets were sufficiently dried in air, and sintered in a range from 1300 to 1500° C. Thereby, the solid electrolyte layer 16 was produced. The thickness of the solid electrolyte layer 16 was 100 μm. The thickness of the first electrolyte layer 16a was 5 μm, and is 5% with respect to the thickness of the second electrolyte layer 16b.

The fuel cell 11 was formed by sintering the fuel electrode layer 13 onto the second electrolyte layer 16b in a range from 1000 to 1200° C., and sintering the air electrode layer 14 onto the first electrolyte layer 16a in a range from 800 to 1100° C.

EXAMPLE 2

The first and second electrolyte layers 16a and 16b were produced by coating the alumina setter on a green sheet having the composition represented by $La_{0.9}Sr_{0.1}Ga_{0.8}Mg_{0.12}Co_{0.08}O_{3-d}$ and sintering. The first electrolyte layer 16a was formed at the surface layer of the green sheet, which was coated with the alumina setter. The remainder of the green sheet was the second electrolyte layer 16b. The thickness of the solid electrolyte layer 16 comprising the first and second electrolyte layers 16a and 16b was 100 μm. The fuel cell 11 was formed using the solid electrolyte layer 16, similar to Example 1.

The quantity of the elements in the solid electrolyte layer 16 of the fuel cells formed in this Example were analyzed by the Electron Probe Microanalysis (EPMA) method. The results are shown in Table 1. Moreover, "d" in Table 1 indicates the depth from the surface of the solid electrolyte layer 16, which was coated with the alumina setter.

TABLE 1

| Element | Depth from the surface of the solid electrolyte layer (μm) | | | | | | |
|---|---|---|---|---|---|---|---|
| | 5 | 10 | 15 | 25 | 50 | 70 | 95 |
| La | 0.902 | 0.901 | 0.900 | 0.900 | 0.900 | 0.900 | 0.900 |
| Sr | 0.098 | 0.099 | 0.100 | 0.100 | 0.100 | 0.100 | 0.100 |
| Ga | 0.824 | 0.822 | 0.820 | 0.812 | 0.800 | 0.800 | 0.800 |
| Mg | 0.144 | 0.142 | 0.142 | 0.132 | 0.122 | 0.120 | 0.120 |
| Co | 0.032 | 0.036 | 0.038 | 0.066 | 0.078 | 0.080 | 0.080 |
| | First electrolyte layer | | | Second electrolyte layer | | | |

In Table 1, the units of the percentage content are atomic %; La + Sr = 1.0, and Ga + Mg + Co = 1.0

As shown in Table 1, the first electrolyte layer 16a having a thickness of 15 μm was formed in the upper surface of the solid electrolyte layer 16. The remainder of the solid electrolyte layer 16 was the second electrolyte layer 16b.

EXAMPLE 3

A fuel cell 11 was produced in a manner identical to that of Example 1, except the fuel electrode layer 13 was sintered onto the first electrolyte layer 16a, and the air electrode layer 14 was sintered onto the second electrolyte layer 16b.

COMPARATIVE EXAMPLE 1

A comparative fuel cell was produced in a manner identical to that of Example 1, except the first electrolyte layer 16a. Moreover, the thickness of the solid electrolyte layer, which corresponds to the second electrolyte layer 16b, was 100 μm, similar to the Example 1.

COMPARATIVE EXAMPLE 2

A comparative fuel cell was produced in a manner identical to that of Example 1, except the second electrolyte layer 16b. Moreover, the thickness of the solid electrolyte layer, which corresponds to the first electrolyte layer 16a, was 100 μm, similar to Example 1.

COMPARATIVE EXAMPLE 3

A comparative fuel cell was produced in a manner identical to that of Example 1, provided that the solid electrolyte layer 16 was made of YSZ. Moreover, the thickness of the solid electrolyte layer made of YSZ was 100 μm, similar to Example 1.

(Performance Test)

The power generation characteristics of the fuel cells produced in Examples 1 to 3 and Comparative Examples 1 to 3 were examined at 650° C. by using hydrogen gas as fuel and air as oxidizing agent. The results are shown in FIGS. 3 to 8.

The power generation characteristics of the fuel cell produced in Comparative Example 3 was extremely lower than that of the fuel cells produced in Examples 1 to 3 and Comparative Examples 1 and 2. It is considered that this was caused by the fact that the ionic transference number of the lanthanum-gallate oxide is larger than that of YSZ at low temperatures.

Moreover, the performance of the fuel cells produced in Comparative Examples 1 and 2, which comprise the solid electrolyte layer 16 made of the lanthanum-gallate oxide, is inferior to that of the fuel cells produced in Examples 1 to 3. This may be caused due to the decrease of the total electric conductivity of the solid electrolyte layer 16 itself in the fuel cell produced in Comparative Example 2. In the fuel cell produced in Comparative Example 1, the percentage of the ionic conductivity with respect to the total electric conductivity is small, therefore, the generation performance is inferior to that of the fuel cells produced in Examples 1 to 3.

It is clear from the tests that the fuel cells produced as in Examples 1 to 3 have a higher ratio of ionic conductivity to total electric conductivity, which is also higher than those of conventional fuel cells comprising a solid electrolyte layer made of a lanthanum-gallate oxide having single composition; therefore, the efficiency of the fuel cells produced in Examples 1 to 3 is superior to that of conventional fuel cells.

What is claimed is:

1. A solid oxide fuel cell comprising an air electrode layer, a fuel electrode layer, and a solid electrolyte layer interposed between said air electrode layer and said fuel electrode layer, wherein said solid electrolyte layer comprises a first electrolyte layer which is made of a lanthanide-gallate oxide and has a first ionic transference number and a first total electric conductivity, and a second electrolyte layer which is made of a lanthanide-gallate oxide and has a second ionic transference number smaller than said first ionic transference number and a second total electric conductivity larger than said first total electric conductivity;

said air electrode layer is laminated onto one side of said solid electrolyte layer;

said fuel electrode layer is laminated onto the other side of said solid electrolyte layer;

said first and second electrolyte layers are made of a compound represented by general formula (1): $Ln_{1-a}A_aGa_{1-(b+c)}B_bCo_cO_3$, wherein Ln is lanthanide rare earth metals; wherein A is one or more kinds of Sr, Ca, and Ba; B is one or more kinds of Mg, Al, and In; a is in the range from 0.05 to 0.3; b is in the range from 0 to 0.3; c is in the range from 0 to 0.2; and (b+c) is in the range from 0.025 to 0.3;

an amount of Co in said first electrolyte layer is $0\% \leq Co \leq 80\%$ with respect to an amount of Co in said second electrolyte layer; and a thickness of said second electrolyte layer is larger than a thickness of said first electrolyte layer.

2. A solid oxide fuel cell according to claim 1 wherein said lanthanide-gallate oxide is a lanthanum-gallate oxide.

3. A solid oxide fuel cell according to claim 2 wherein:

said lanthanum-gallate oxide is a compound represented by general formula (1): $La_{1-a}A_aGa_{1-(b+c)}B_bCo_cO_3$, wherein A is one or more kinds of Sr, Ca, and Ba; B is one or more kinds of Mg, Al, and In; a is in the range from 0.05 to 0.3; b is in the range from 0 to 0.3; c is in the range from 0 to 0.2; and (b+c) is in the range from 0.025 to 0.3; and an amount of Co in said first electrolyte layer is 0 or 80% less than an amount of Co in said second electrolyte layer.

4. A solid oxide fuel cell according to claim 3, wherein a thickness of said solid electrolyte layer comprising said first and second electrolyte layers is in a range from 1 to 500 μm; and a percentage of said thickness of said first electrolyte layer with respect to said thickness of said solid electrolyte layer is in a range from 1 to 20%.

5. A solid oxide fuel cell according to claim 3, wherein said amount of Co decreases gradually from said second electrolyte layer to said first electrolyte layer in the vicinity of the interface between said first electrolyte layer and said second electrolyte layer.

* * * * *